(12) United States Patent
Kielbowicz et al.

(10) Patent No.: US 11,448,263 B2
(45) Date of Patent: Sep. 20, 2022

(54) AXIAL SHAFT COUPLING

(71) Applicant: Hamilton Sundstrand Corporation, Charlotte, NC (US)

(72) Inventors: Dariusz Kielbowicz, Boleslawiec (PL); Marcin Cis, Lutynia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 132 days.

(21) Appl. No.: 16/511,383

(22) Filed: Jul. 15, 2019

(65) Prior Publication Data

US 2020/0025255 A1 Jan. 23, 2020

(30) Foreign Application Priority Data

Jul. 20, 2018 (EP) .................................. 18461584

(51) Int. Cl.
*F16D 1/04* (2006.01)
*H02K 49/10* (2006.01)

(52) U.S. Cl.
CPC ............. *F16D 1/04* (2013.01); *H02K 49/106* (2013.01); *H02K 49/108* (2013.01); *Y10S 403/01* (2013.01); *Y10T 403/7032* (2015.01)

(58) Field of Classification Search
CPC ........ F16D 1/04; F16D 2001/103; F16D 1/10; H02K 49/108; H02K 49/106; Y10T 403/7032; Y10S 403/01
USPC .......................................................... 464/29
See application file for complete search history.

(56) References Cited

U.S. PATENT DOCUMENTS

| 2,939,559 | A | 6/1960 | Grant |
| 4,232,535 | A | 11/1980 | Caldwell |
| 6,843,353 | B2* | 1/2005 | Majewski ............. F16D 27/118 |
| 8,444,322 | B2* | 5/2013 | Langer ................ B60B 27/0084 |
| 10,208,808 | B2* | 2/2019 | Schwab ............. A61B 1/00158 |
| 2006/0123936 | A1 | 6/2006 | French |
| 2016/0258506 | A1 | 9/2016 | Deane et al. |
| 2020/0292114 | A1* | 9/2020 | Liu ......................... F16G 15/08 |

FOREIGN PATENT DOCUMENTS

| EP | 1803342 A1 | 7/2007 |
| JP | S61184220 A | 8/1986 |

OTHER PUBLICATIONS

Extended European Search Report for International Application No. 18461584.7 dated Nov. 7, 2018, 7 pages.

* cited by examiner

*Primary Examiner* — Greg Binda
(74) *Attorney, Agent, or Firm* — Cantor Colburn LLP (57) ABSTRACT a coupling assembly includes a first portion and a second portion which are configured to couple to one another such that the second portion is capable of rotationally driving the first portion about an axis of rotation. The first portion is provided with a first magnet and the second portion is provided with a second magnet. The first and second magnets are arranged to repel each other such that the first and second portions are biased away from each other in an axial direction that is parallel to the axis of rotation.

16 Claims, 4 Drawing Sheets

AXIAL SHAFT COUPLING

FOREIGN PRIORITY

This application claims priority to European Patent Application No. 18461584.7 filed Jul. 20, 2018, the entire contents of which is incorporated herein by reference.

FIELD

The present disclosure relates generally to drive shaft assemblies, and particularly to couplings between power transmission shafts. The drive shaft assemblies may be suitable for use in the aerospace vehicles.

BACKGROUND

The flexibility of an aircraft structure may cause axial and angular misalignment of power transmission shafts. Whilst couplings may be provided between power transmission shafts, conventional couplings may not respond to displacements of the power transmission shafts in a suitable manner.

SUMMARY

The present disclosure provides a coupling assembly for a drive shaft assembly. The coupling assembly comprises a first portion and a second portion which are configured to couple to one another such that the second portion is capable of rotationally driving the first portion about an axis of rotation. The first portion is provided with a first magnet and the second portion is provided with a second magnet. The first and second magnets are arranged to repel each other such that the first and second portions are biased away from each other in an axial direction that is parallel to the axis of rotation.

The first and second portions may rotate about an axis which defines the axial direction.

The magnets may assist with compensating for axial displacements of the first (driven) and second (driving) portions of the coupling assembly. For instance, the magnets may provide a repulsive force that increases (e.g. exponentially) as a gap between the first and second magnets decreases. In this manner, the magnets may resist external forces which would force the first and second portions of the coupling assembly towards one another. The repulsive force may assist with biasing the first and second portions of the coupling assembly towards a predetermined position (e.g. corresponding to a correct alignment of the first and second portions).

The first and second portions may be operatively connected by means of a splined coupling.

The splined coupling may comprise interengaging teeth or grooves. The grooves or teeth may be provided on both of the first and second portions of the coupling assembly. The teeth or grooves may be arranged circumferentially about the first and second portions. The teeth or grooves may be elongated and may extend in the axial direction. The teeth or grooves may be configured to transmit a rotational driving force between the first and second portions.

The splined coupling may comprise interengaging teeth and grooves on the first and second portions. The first and second magnets may provide an axial force that inhibits the first and second portions from being axially shifted towards one another and biases the first and second portions to a position at which the teeth and grooves on the first portion are axially aligned with the teeth and grooves on the second portion.

The splined connection may be biased such that the teeth or grooves on the first and second portions fully overlap.

The first magnet may be disposed towards an end of the first portion, and the second magnet may be disposed towards an end of the second portion that faces the end of the first portion.

The magnets may be arranged such that the north pole of the first magnet is positioned axially adjacent to the north pole of the second magnet, or the south pole of the first magnet is positioned axially adjacent to the south pole of the second magnet such that opposing poles of the magnets face one another.

The first and second magnets may comprise substantially cylindrical magnets. The magnets may be arranged such that a circular end surface of the first magnet faces a circular end surface of the second magnet.

Alternatively, the magnets may be of any suitable shape provided that an end surface of the first magnet faces and is axially adjacent to an end surface of the second magnet, and that the end surfaces which face each other correspond to opposing poles. The magnets may therefore have a shape which is a square, oblong, or other prism or other shape.

The first and second magnets may be positioned such that an axial gap is maintained between the first and second magnets.

At least one of the first and second portions may be provided with an abutting portion which extends axially towards the other of the first and second portions, for contacting the other of the first and second portions and preventing the first and second portions from contacting one another when the first and second portions are forced together.

In a condition when the first and second portions are not forced together, the abutting portion may not contact the other of the first and second portions.

The abutting portion may comprise a lip of the end of the first portion or second portion. The lip may be configured to abut against a surface of the other portion.

If the magnets are not sufficiently strong to overcome a compressive axial force, the abutting portion may prevent the magnets from being forced to contact one another.

Each of the first and second portions of the coupling assembly may be configured to attach to a (drive or driven) shaft, e.g. by a bolted connection, gluing, riveting or welding. The second portion may be configured to attach to a drive shaft, wherein the drive shaft rotationally drives the second portion. The first portion may be configured to attach to a driven shaft that is rotationally driven by the first portion. Alternatively, the first portion may be configured to attach to a drive shaft, and the second portion may be configured to attach to a driven shaft.

To assist with aligning (drive or driven) shafts which are to be attached to the coupling assembly, the first and second portions of the coupling assembly may each comprise an elongated portion which extends in a direction away from the first and second magnets respectively. The elongated portion may be in the form of a shaft, Each elongated portion may define a longitudinal axis which is aligned (or coaxial with) the axial direction.

The present disclosure also provides a drive shaft assembly comprising a coupling assembly as described herein. The first portion of the coupling assembly may be attached to, or integral with, an elongated first shaft. The second portion may be attached to, or integral with, an elongated second shaft.

The first and second elongate shafts may be attached to the first and second portions by any suitable means, such as by a bolted connection, gluing, riveting or welding.

The first and second shafts of the drive shaft assembly may respectively define a first and second longitudinal axis. The first and second magnets may be arranged to repel each other such that the first and second shafts are biased axially away from each other along the direction of their respective longitudinal axes.

The axial direction (along which the magnets bias the first and second portions) may aligned with (or coaxial with) the longitudinal axis of each of the shafts. The magnets may bias the first shaft in the direction of its longitudinal axis, and the second shaft along the direction of its longitudinal axis. The first and second longitudinal axes may be substantially aligned or coaxial with one another.

The first or second shaft of the drive shaft assembly may be a drive shaft that rotationally drives the first or second portion of the coupling assembly. The other of the first or second shaft may be a driven shaft that is rotationally driven by the first or second portion of the coupling assembly.

The drive shaft may be coupled to a suitable driving mechanism, such as a motor.

The present disclosure also provides a drive shaft comprising a first coupling assembly corresponding to a coupling assembly as described herein. The drive shaft assembly further comprises second coupling assembly. The second coupling assembly comprises a third portion and a fourth portion which are configured to couple to one another such that the third portion is capable of rotationally driving the fourth portion about a second axis of rotation. The third portion is provided with a third magnet and the fourth portion is provided with a fourth magnet, and the third and fourth magnets are arranged to repel each other such that the third and fourth portions are biased away from each other in a second axial direction that is parallel to the second axis of rotation. The drive shaft assembly further comprises a shaft arranged between the first and second coupling assemblies and that is operatively connected to the first and second coupling assemblies.

The third (driving) and fourth (driven) portions may have any of the features described with relation to the second (driving) and first (driven) portions, respectively.

The shaft may be a drive shaft that is configured to simultaneously drive both of the coupling assemblies. In this case, the drive shaft may be connected to the second (drive) and third (drive) portions to rotationally drive the second and third portions. The drive shaft may be driven by a suitable device (e.g. a motor).

Alternatively, the shaft may be a transmission shaft for transmitting a rotational force between the first and second coupling assemblies. In this case, the transmission shaft may be connected to the second (drive) and fourth (driven) portions, or to the third (drive) and first (driven) portions.

The second axial direction may be aligned with (or coaxial with) the axial direction of the first coupling assembly. The shaft may be elongated and define a longitudinal axis which is aligned (or coaxial) with the second axial direction and the axial direction of the first coupling assembly.

The shaft may be removably connected to the first and second coupling assemblies (e.g. by a bolted or splined connection). Alternatively, the shaft may be permanently connected to (or integrally formed with) the first and second coupling assemblies (e.g. by gluing, riveting or welding).

The shaft may be positioned between the first and second coupling assemblies (and hence between the magnets of the first coupling assembly and the magnets of the second coupling assembly). The first and second magnets form a repulsive magnet pair, and the third and fourth magnets form another repulsive magnet pair. The first and second magnets in combination with the third and fourth magnets may provide a force which biases the shaft axially away from both of the coupling assemblies and towards the centre of the drive assembly.

The present disclosure also provides an aerospace vehicle comprising a coupling assembly or drive shaft assembly as described herein.

The present disclosure also provides a method of aligning a coupling assembly for a drive shaft assembly. The method comprises providing a first coupling assembly corresponding to a coupling assembly described herein, coupling the first portion of the first coupling assembly to the second portion of the first coupling assembly, and biasing the first and second portions axially away from one another via magnetic force provided by the first and second magnets The present disclosure also provides a method of aligning a drive shaft assembly. The method comprises providing a first coupling assembly corresponding to a coupling assembly as described herein, wherein the first and second magnets of the first coupling assembly comprise a first pair of magnets. The method further comprises providing a second coupling assembly corresponding to a coupling assembly as described herein, wherein the first and second magnets of the second coupling assembly comprise a second pair of magnets. The method further comprises providing a shaft between the first and second coupling assemblies, such that the shaft is biased towards a centred position between the first and second coupling assemblies, wherein the biasing is via magnetic forces between the first and second pairs of magnets.

The present disclosure also provides a method of assembling a drive shaft assembly. The method comprises providing a first coupling assembly such as a coupling assembly described herein, and attaching a first end of a first shaft to the first portion or second portion of the first coupling assembly.

The method of assembling a drive shaft assembly may further comprise providing a second coupling assembly. The second coupling assembly may comprise a third portion and a fourth portion which are configured to couple to one another such that the third portion is capable of rotationally driving the fourth portion about second axis of rotation. The third portion may be provided with a third magnet and the fourth portion may be provided with a fourth magnet. The third and fourth magnets may be arranged to repel each other such that the third and fourth portions are biased away from each other in a second axial direction that is parallel to the second axis of rotation. The method may further comprise attaching a second end of the shaft to the third or fourth portion of the second coupling assembly, such that the shaft is positioned between the first and second coupling assemblies.

BRIEF DESCRIPTION OF THE DRAWINGS

Various embodiments will now be described, by way of example only, and with reference to the accompanying drawings in which.

DETAILED DESCRIPTION

The present application relates to drive shaft assemblies and coupling assemblies for drive shaft assemblies, which may be configured to provide a biasing force to encourage proper axial alignment of power transmission shafts. This is of importance, for example, in aircraft structures, which due to their flexibility can cause power transmission shafts to become misaligned. However, it will be appreciated that the drive shaft assemblies and couplings disclosed herein may be used in other structures having shafts that engage each other.

Figure 1:
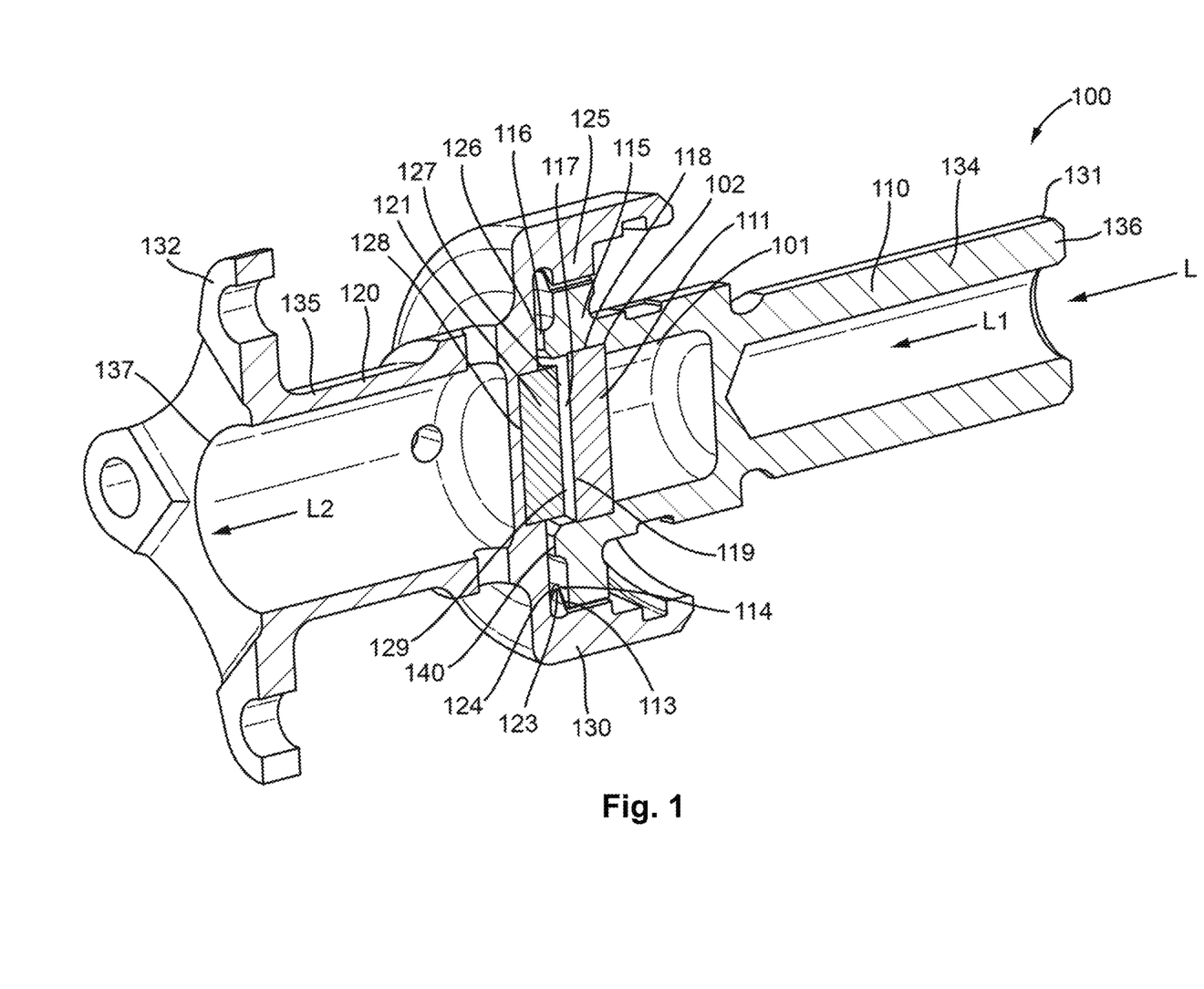
FIG. 1 shows a perspective view of a coupling assembly according to an embodiment which is provided with first and second magnets for biasing first and second portions of the coupling assembly axially away from each other.

FIG. 1 shows a coupling assembly 100 according to an embodiment of the present disclosure.

The assembly comprises a first portion 110 and a second portion 120. The second portion 120 is configured to rotationally drive the first portion 110 about an axis of rotation. Alternatively, depending on which portion of the coupling a rotational drive force is applied to, the first portion 110 may be configured to rotationally drive the second portion 120. The first and second portions 110, 120 are configured to rotate about an axis L which defines an axial direction of the coupling assembly.

Each of the first and second portions 110, 120 may be configured to attach to a shaft (not shown), such as a drive shaft or a driven shaft. A drive shaft may be a shaft that is driven by motor (not shown). Hence, either of the first and second portions 110, 120 could be driven. For example, a splined connection 131 may couple the first portion 110 to a shaft. As an example, the second portion 120 may be provided with a flange 132 adapted to receive a bolt for bolting the second portion 120 to a shaft. However, the first and second portions 110, 120 may be coupled to shafts by any suitable connection, such as, for example, welding, riveting or gluing.

To assist with aligning the coupling assembly 100 with any shaft that is to be attached to the first and second portions 110, 120, the first and second portions 110, 120 may respectively comprise a first and second elongate portion 134, 135. Each elongate portion 134, 135 may be in the form of an elongate shaft. Each elongate portion 134, 135 may define a respective longitudinal axis $L_1$, $L_2$. Each longitudinal axis $L_1$, $L_2$ may be aligned (or coaxial with) the axial direction L of the coupling assembly. The splined connection 131 may be disposed towards a distal end 136 of the first elongate portion 134. The flange 132 may be disposed towards a distal end 137 of the second elongate portion 135.

The first and second portions 110, 120 may be coupled to one another such that a longitudinal end surface 116 of the first portion is proximal to (and/or facing) a longitudinal end surface 126 of the second portion.

The first and second portion 110, 120 may be coupled to one another by a coupling 130. The coupling 130 may be compliant, and may be configured to allow some axial (and optionally angular) displacement of the first and second portions relative to each other. In this manner, the coupling 130 is not rigid, and can respond to external bending and compressive forces. For instance, the coupling assembly 100 may suitable for incorporation into an aerospace vehicle or aircraft. For example, the external bending and compressive forces may be due to fuselage deflection drivetrain load, or acceleration of the aerospace vehicle.

The coupling 130 transmits a rotational driving force between the first and second portions. The coupling 130 may couple the first and second portions such that axes $L_1$, $L_2$ are aligned. The coupling 130 may be a splined coupling, however other types of couplings could be used.

The splined coupling 130 comprises interengaging teeth 113, 123 and grooves 114, 124. The first portion 110 may be a male portion, and the second portion 120 is a female portion. Teeth 113 and grooves 114 may be provided on an external surface of the first portion 110. Corresponding teeth 123 and grooves 124 may be provided on an internal surface of the second portion 120 for engaging and receiving the grooves 114 and teeth 113, respectively, on the first portion 110. The teeth and grooves may be spaced circumferentially around the first and second portion.

A male portion 115 of the first portion 110 may be received by a female portion 125 of the second portion 120. The female portion 125 comprises a sleeve that receives and extends around the male portion 115. The sleeve 125 has diameter that is larger than the diameter of female portion 115. The teeth 113, 123 and grooves 114, 124 are provided on the male and female portions 115, 125.

The teeth 113, 123 and grooves 114, 124 may be elongate and have a length extending substantially in the axial direction of the coupling assembly.

As used herein, the 'axial direction' and 'axially' may be the direction parallel to (e.g. aligned or coaxial with) the axis of rotation L about which the first and/or second portions 110, 120 rotate. The 'axial direction' and 'axially' may also refer to a direction along either of the longitudinal axes $L_1$ or $L_2$ In use, the first and second portions 110, 120 may be subjected to external forces, such as axially compressive forces which would urge the first and second portions 110, 120 longitudinally towards one another. The coupling assembly disclosed herein may counteract such forces, by providing a biasing (or centring) mechanism which provides a (centring) force that biases the portions 110, 120 towards a properly aligned position. FIG. 1 illustrates the coupling assembly in the 'properly aligned' condition.

The 'properly aligned' position may correspond to a position where the teeth 113, 123 and grooves 114, 124 are axially aligned, such that each cooperating pair of tooth and groove is engaged along substantially their entire lengths. Alternatively, if the teeth and grooves have different lengths, the properly aligned' position may be one in which the shorter of the teeth or grooves fully axially overlaps with the longer of the teeth or grooves. The 'properly aligned' position may correspond to a position where, in the absence of externally applied transient longitudinally compressive forces, the assembly is at an equilibrium position at which the biasing force does not move the shafts axially away from each other.

The biasing force may be provided by first and second magnets 111, 121. The magnets are arranged on the first and second portions 110, 120 to repel each other such that the first and second portions 110, 120 are biased axially away from each other. The first magnet 111 is disposed towards an end 117 of the first portions 110, and the second magnet 121 is disposed towards an end 127 of the second portion. The first magnet 111 may be held within a recess 118 in the inner surface 101 of the first portion 110. The magnet 111 is prevented from moving axially by a shoulder 102 of the inner surface 101. The second magnet 121 may be held in a recess 128 of the end surface 126 of the second portion 120. However, other means for holding the magnets in position are possible.

The magnets 111, 121 are oriented such that opposing poles of the magnets are axially adjacent to and face one another. For example, the north pole of the first magnet 111 may face the north pole of the second magnet 121. However, the south pole of the first magnet 111 could instead face the south pole of the second magnet 121. In this manner, the magnets 111, 121 provide a repulsive force that urges the first and second portions 110, 120 away from one another when the magnets are sufficiently (i.e. overly) close together.

The magnets 111, 112 may each have substantially planar end surface 119, 129, wherein the planar end surfaces 119, 129 are positioned axially adjacent to one another. For example, the magnets may each have a cylindrical shape, and a circular end surface 119 of the first magnet may be positioned axially adjacent to a circular end surface 129 of the second magnet. However, other shapes of magnet may be used provided that opposing poles face one another to provide a repulsive force in the axial direction.

The magnets may be permanent magnets. The magnets may comprise a rare earth metal such as Neodymium. The magnets may comprise an alloy comprising at least one of Neodymium, Iron and Boron. The magnets may comprise an N52 grade magnet. The magnets may have a residual flux density (Br) of at least 10,000, optionally at least 14,000 Gauss. The residual flux density is generally defined as the magnetic induction remaining in the saturated magnetic material after the magnetizing field has been removed.

Figure 4:
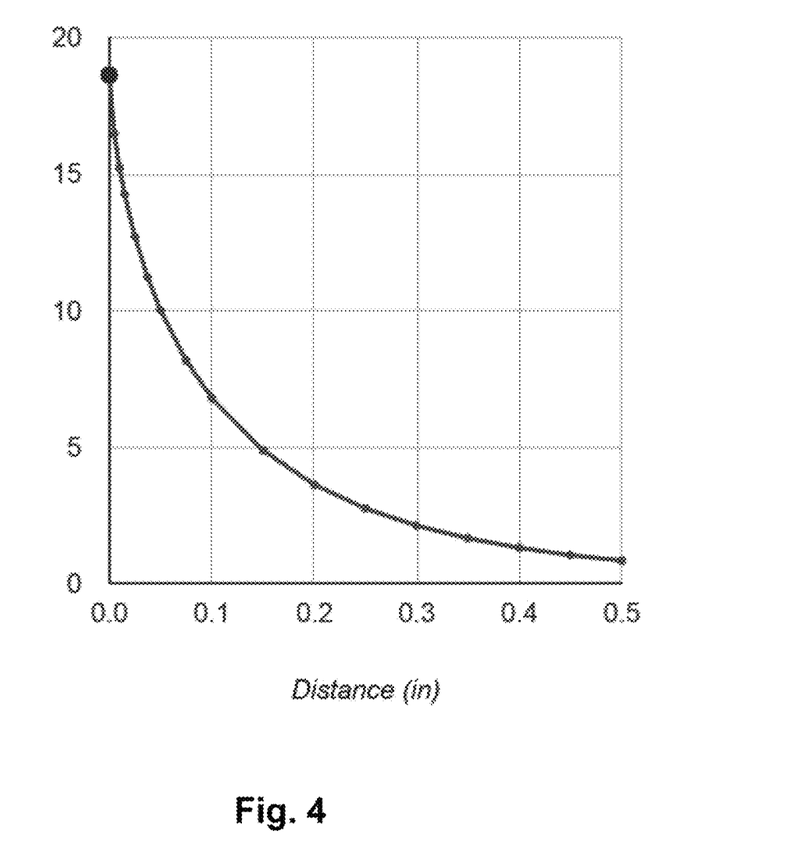
FIG. 4 is a graph that illustrates how the repulsive force between the magnets varies with distance between the magnets.
Figure 5:
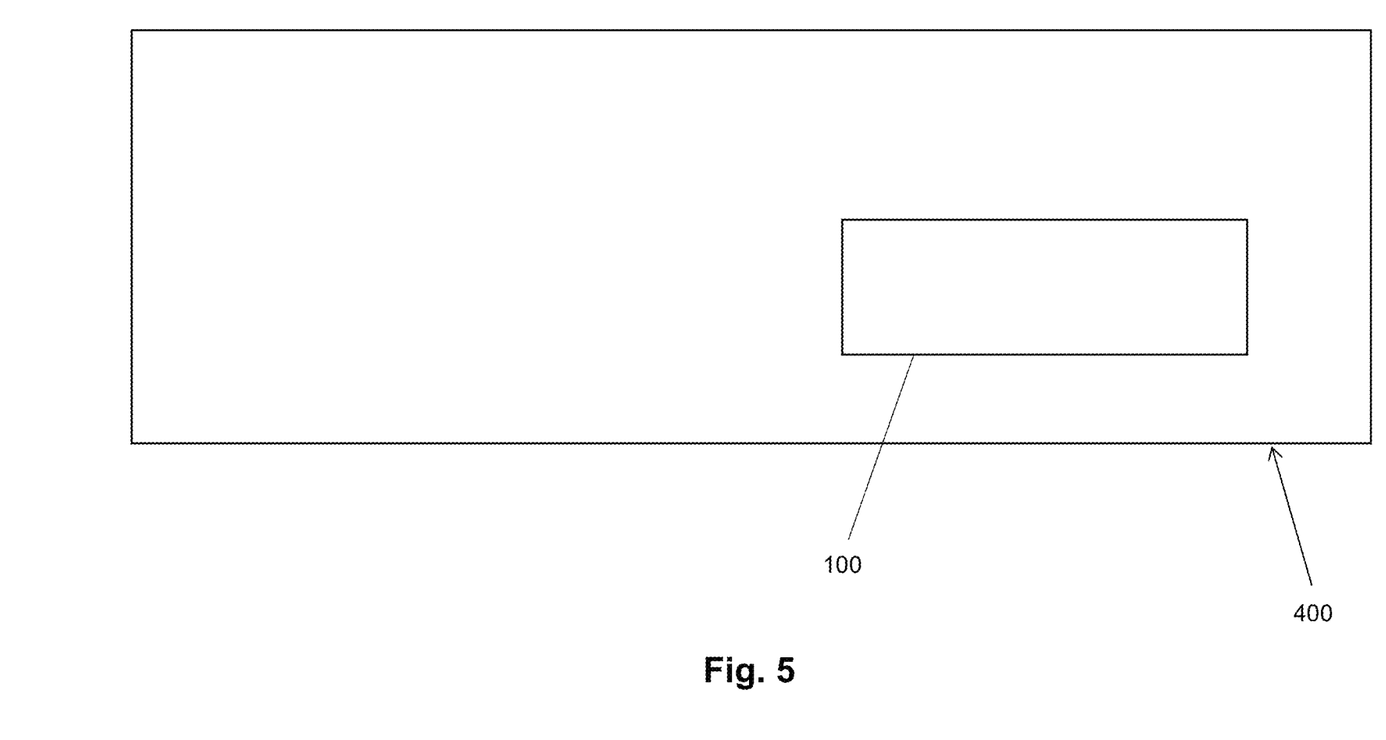
FIG. 5 shows an aerospace vehicle with a coupling assembly.

FIG. 4 illustrates how the repulsive force between the magnets varies with distance between the magnets. Distance in inches (1 inch=2.54 cm) between the magnets is plotted on the x axis, whilst the repulsive force in pounds (1 lbf=4.45 N) is plotted on the y axis. The data is shown for exemplary cylindrical grade N52 magnets, each having a diameter of 0.7 inches and a thickness of 0.2 inches. As can be seen from FIG. 4, the repulsive force of the magnets is approximately 1 lbf (4.45 N) when the distance between the magnets is 0.5 inches (12.5 mm). The repelling force grows exponentially as distance between the magnets decreases. At a distance near zero, the repulsive force is −18 lbf (80 Newtons). Such a rapid growth of repelling force is not achievable by means of a mechanical spring. Bigger magnets can easily achieve forces of several hundreds of Newtons at gap value close to zero.

As can be seen from FIG. 4, the repulsive biasing force provided by the magnets increases rapidly as the distance between the magnets decreases. This has implications upon the coupling assembly disclosed herein.

Referring back to FIG. 1, the coupling assembly is shown in the absence of externally applied axial compressive forces. The position shown in FIG. 1 corresponds to a 'properly aligned' position. In this position, there is an axial gap between the magnets (i.e. in the axial direction), such that the axially repulsive force between the magnets is relatively low and not sufficient to move the first and second portions 110, 120 further apart in the axial direction. This may also be referred to herein as the 'centred' or equilibrium position of the assembly. The axial gap between the magnets may be defined as an axial distance between the end surfaces 119, 129 of the magnets which face one another.

Should either of the first and second portions 110, 120 become axially displaced towards the other shaft, the magnets 111, 121 will resist movement of the first and second portions 110, 120. However, if an external force is applied to one or both of the first and second portions 110, 120 that is sufficient to overcome the repulsive force between the magnets, the first and second portions 110, 120 will move towards one another. If the force is high, the repulsive force between the magnets may not be able to resist it. To prevent the magnets 111, 121 from touching one another, the first portion 110 may be provided with an abutting portion 140. The abutting portion 140 extends axially towards the second portion 120. If the shafts are forced together, the abutting portion will contact the second portion 120 and prevent further movement of the first and second portions 110, 120 towards each other. The abutting portion 140 acts as a bumper. When the abutting portion 140 contacts the second portion 120, a gap remains between the magnets 111, 121. Alternatively, or additionally, an abutting portion could be provided on the second portion 120 for contacting the first portion 110.

In the 'properly aligned' or centred position (e.g. in the absence of external axially compressive forces), there is a gap between the abutting portion 140 and the second portion 120.

Figure 2:
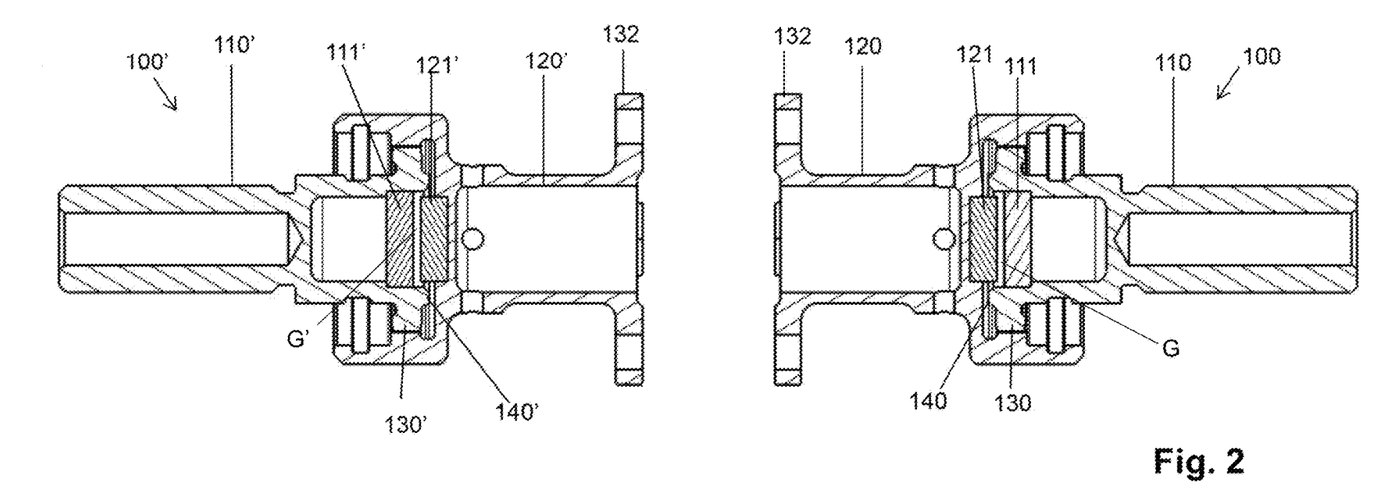
FIG. 2 shows a side view of a two coupling assemblies between which a drive or transmission shaft may be attached.

The coupling of FIG. 1 may be incorporated into a drive assembly, such as that shown in FIG. 2, Turning to FIG. 2, the drive assembly may comprise two coupling assemblies 100, 100' of the sort described with respect to FIG. 1 in a mirrored configuration. Components such as the first magnet 111, second magnet 121, first portion 110, second portion 120, splined coupling 130, abutting portion 140 and axis of rotation L are indicated for the first assembly 100. Like components on the other assembly 100' are indicated with a symbol following the numeral. It will be understood that the assemblies can share any number of features with the assembly described with respect to FIG. 1.

In the arrangement of FIG. 2, the two coupling assemblies may each be attached to either end of a component such as a shaft (not shown) such that the shaft is positioned between the two coupling assemblies. The (central) shaft (not shown) may be bolted to each of the flanges 132, 132', however other connections may be used such as, for example, welding, riveting or gluing. The shaft may be a drive shaft that is configured to rotationally drive both of the coupling assemblies 100, 100'. Alternatively, the shaft may be a transmission shaft that is configured to transmit a rotational driving force between the coupling assemblies 100, 100'

In the arrangement of FIG. 2, the first and second magnets 111, 121 act as a repulsive pair, and the other first and second magnets 111', 121' also act as a repulsive pair. The repulsive force from each pair of magnets biases the shaft between the assemblies 100, 100' (not shown) towards the centre of the drive assembly. In this manner, the pairs of magnets act in tandem to centre and stabilise the shaft between the two couplings assemblies. For each pair of magnets, the magnets have opposing poles facing one another such that the magnets provide a repulsive force in the axial direction.

If the central shaft is moved towards a first one of the coupling assemblies 100, then the gap between magnets 111, 121 will decrease and the repulsive force between those magnets 111, 121 will increase, whilst the gap between the magnets 111', 121' of the other coupling assembly 100' may increase, and the repulsive force between those magnets 1'

1', 121' may decrease. Hence the magnets will urge the shaft back towards a centred position at which the forces between the pairs of magnets may be equalised. At the centred position, the gap G, G' between each pair of magnets may be approximately equal. This may be referred to as 'self-centring' of the drive assembly.

When employed in aerospace vehicles, the self-centring may return the shaft to the centred position after being misaligned due to e.g. fuselage deflection, drivetrain load or acceleration.

The centred position may correspond to the 'properly aligned' position discussed previously, wherein each of the splined couplings 130, 130' is axially aligned.

Figure 3:
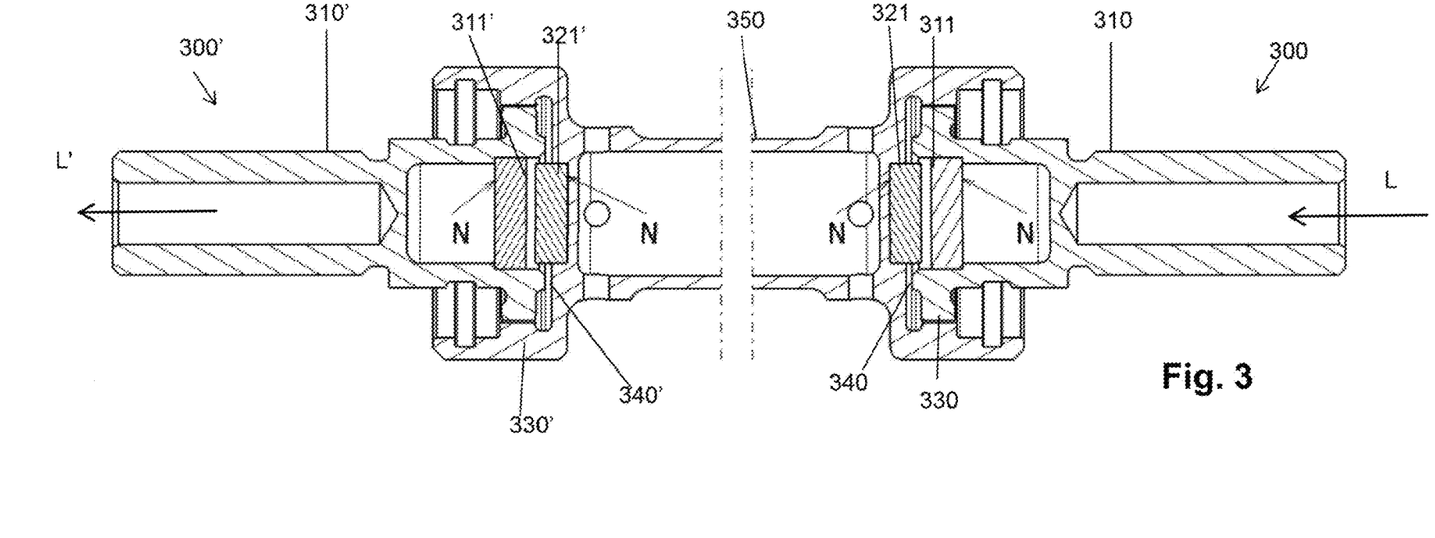
FIG. 3 shows a side view of a drive shaft assembly comprising two coupling assemblies connected by a drive or transmission shaft.

FIG. 3 shows a drive assembly comprising two coupling assemblies 300, 300' similar to those described with respect to FIG. 1. Components such as the first magnet 311, second magnet 321, first portion 310, second portion 320, splined coupling 330 and abutting portion 340 are indicated for the first assembly 300. Like components on the other assembly 300' are indicated with a ' symbol following the numeral. It will be understood that the assemblies can share any number of features with the assembly described with respect to FIG. 1.

The assembly of FIG. 3 is similar to the assembly of FIG. 2, except that in FIG. 3 the second portions 320, 320' are formed integrally with a central shaft 350 (e.g. which may be a drive shaft). The dot-dash lines denote an indeterminate length of the shaft 350. In a similar manner as described in FIG. 2, the pairs of magnets 311, 321 and 311', 321' act in tandem to urge the shaft 350 towards a centred position at which the repulsive force between the one pair of magnets 311, 321 equals the repulsive force between the other pair of magnets 311', 321'.

In the embodiments described above, due to the biasing (e.g. self-centring) of the assembly, the (first and second) portions of the coupling assemblies are returned to a position where the splined connections are properly aligned. This may result in the splines (teeth and grooves) wearing out more slowly due to being urged back to a position where they can be engaged fully. The biasing (e.g. self-centring) is due to magnetic repulsive forces. As such, the biasing is contactless, and does not rely on friction or mechanical interaction between components. The magnets may provide a biasing capability for extended durations with little decrease in performance, and no wear. The magnetic repulsion also helps to prevent the (first and second) portions of the coupling assemblies and any shaft attached thereto from bouncing around in the axial direction. In combination with grease around the coupling assembly, the magnetic repulsion also acts as a damper against axial oscillations. This is particularly the case for drive assemblies such as FIGS. 2 and 3 employing pairs of magnets acting in tandem. The assemblies and couplings described herein may suitable for incorporation into an aerospace vehicle or aircraft. For example, the assemblies and couplings may be used as part of a tail rotor on a helicopter, as part of a slat and flap system in an aeroplane wing, or as part of any other component that requires torque to be transmitted from a power source (e.g. motor) to a mechanically powered actuator, gearbox, propeller etc.

Although the present disclosure has been described with reference to various embodiments, it will be understood by those skilled in the art that various changes in form and detail may be made without departing from the scope of the invention as set forth in the accompanying claims.

Although the coupling assembly portions have been described above as being separate components to the shafts, it is contemplated that one or both coupling portion may be integral with a shaft such as a drive shaft or driven shaft (i.e. rather than attached thereto).

The invention claimed is:

1. A coupling assembly for a drive shaft assembly, the coupling assembly comprising:
   a first portion and a second portion which are configured to couple to one another such that the second portion is capable of rotationally driving the first portion about an axis of rotation;
   wherein the first portion is provided with a first magnet and the second portion is provided with a second magnet;
   wherein the first and second magnets are arranged to repel each other such that the first and second portions are biased away from each other in an axial direction that is parallel to the axis of rotation;
   wherein the first and second portions are operatively connected by means of a splined coupling.

2. The drive shaft assembly of claim 1, wherein the splined coupling comprises interengaging teeth and grooves on the first and second portions; and wherein the first and second magnets provide an axial force that inhibits the first and second portions from being axially shifted towards one another and biases the first and second portions to a position at which the teeth and grooves on the first portion are axially aligned with the teeth and grooves on the second portion.

3. The coupling assembly of claim 1, wherein the first magnet is disposed towards an end of the first portion, and the second magnet is disposed towards an end of the second portion that faces the end of the first portion.

4. The coupling assembly of claim 1, wherein the magnets are arranged such that a north pole of the first magnet is positioned axially adjacent to a north pole of the second magnet, or a south pole of the first magnet is positioned axially adjacent to a south pole of the second magnet such that opposing poles of the magnets face one another.

5. The coupling assembly of claim 1, wherein the first and second magnets each comprise a substantially planar end surface, wherein the substantially planar end surfaces of the first and second magnets face one another.

6. The coupling assembly of claim 1, wherein the first and second magnets are positioned such that an axial gap is maintained between the first and second magnets.

7. The coupling assembly of claim 1, wherein at least one of the first and second portions is provided with an abutting portion which extends axially towards the other of the first and second portions, for contacting the other of the first and second portions and preventing the first and second portions from contacting one another when the first and second portions are forced together.

8. The coupling assembly of claim 1, wherein teeth and grooves are provided on a radially external surface of the first portion and corresponding teeth and grooves are provided on a radially internal surface of the second portion for engaging the grooves and teeth, respectively, of the first portion.

9. The coupling assembly of claim 8, wherein the teeth and grooves are elongate and have a length extending substantially in the axial direction of the coupling assembly.

10. The coupling assembly of claim 9, wherein the axial direction refers to the direction parallel to the axis of rotation about which the first and second portions rotate.

11. A drive shaft assembly comprising:
   the coupling assembly of claim 1;
   wherein the first portion is attached to, or integral with, an elongated first shaft; and wherein the second portion is attached to, or integral with, an elongated second shaft.

12. The drive shaft assembly of claim 11, wherein the first and second shafts respectively define a first and second longitudinal axis; and wherein the first and second magnets are arranged to repel each other such that the first and second shafts are biased axially away from each other along the direction of their respective longitudinal axes.

13. The drive shaft assembly of claim 11, wherein:

the first or second shaft is a drive shaft that rotationally drives the first or second portion of the coupling assembly.

14. The drive shaft assembly of claim 11, further comprising:

a second coupling assembly comprising: a third portion and a fourth portion which are configured to couple to one another such that the third portion is capable of rotationally driving the fourth portion about a second axis of rotation; wherein the third portion is provided with a third magnet and the fourth portion is provided with a fourth magnet; and wherein the third and fourth magnets are arranged to repel each other such that the third and fourth portions are biased away from each other in a second axial direction that is parallel to the second axis of rotation; and wherein the drive shaft assembly comprises a shaft arranged between the first and second coupling assemblies and that is operatively connected to the first and second coupling assemblies.

15. A method of aligning a coupling assembly for a drive shaft assembly comprising:

providing a first coupling assembly corresponding to the coupling assembly as claimed in claim 1;

coupling the first portion of the first coupling assembly to the second portion of the first coupling assembly; and biasing the first and second portions axially away from one another via magnetic force provided by the first and second magnets.

16. A method of aligning a drive shaft assembly comprising:

providing a first coupling assembly corresponding to the coupling assembly as claimed in claim 1, wherein the first and second magnets of the first coupling assembly comprise a first pair of magnets;

providing a second coupling assembly corresponding to the coupling assembly as claimed in claim 1, wherein the first and second magnets of the second coupling assembly comprise a second pair of magnets;

providing a shaft between the first and second coupling assemblies, such that the shaft is biased towards a centred position between the first and second coupling assemblies, wherein the biasing is via magnetic forces between the first and second pairs of magnets.

* * * * *